No. 758,959. PATENTED MAY 3, 1904.
O. CROSBY.
SLING FOR HOLDING SUGAR CANE.
APPLICATION FILED AUG. 26, 1898.
NO MODEL. 2 SHEETS—SHEET 1.
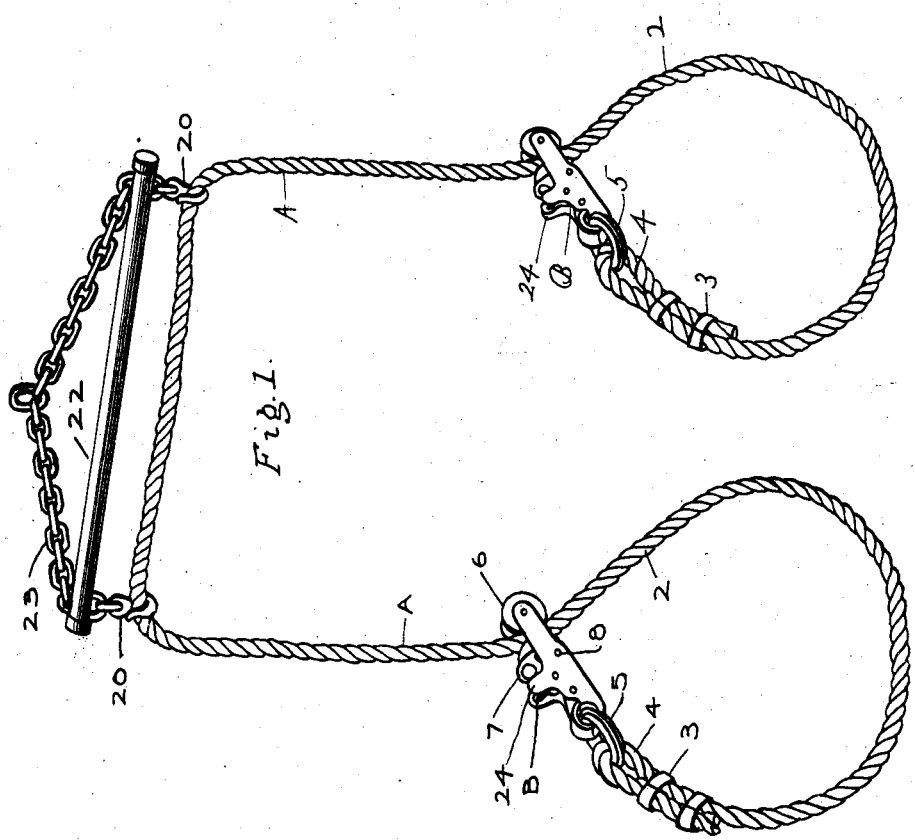

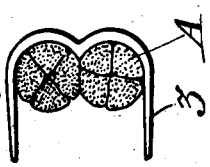
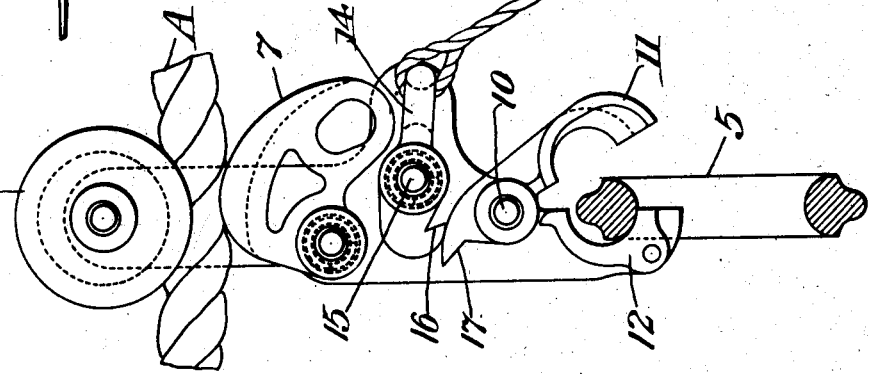
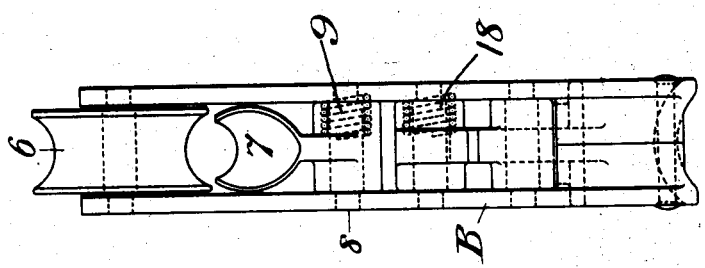
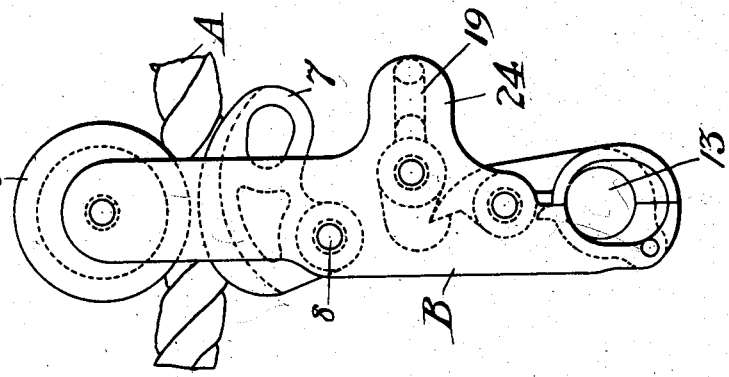

No. 758,959. Patented May 3, 1904.

UNITED STATES PATENT OFFICE.

OLIVER CROSBY, OF ST. PAUL, MINNESOTA, ASSIGNOR TO THE AMERICAN HOIST & DERRICK COMPANY, OF ST. PAUL, MINNESOTA, A CORPORATION OF MINNESOTA.

SLING FOR HOLDING SUGAR-CANE.

SPECIFICATION forming part of Letters Patent No. 758,959, dated May 3, 1904.

Application filed August 26, 1898. Serial No. 689,620. (No model.)

*To all whom it may concern:*

Be it known that I, OLIVER CROSBY, a citizen of the United States, residing at St. Paul, Ramsey county, Minnesota, have invented new and useful Improvements in Slings for Holding Sugar-Cane, of which the following is a specification.

My invention relates to improvements in slings designed particularly for the holding of sugar-cane; and it consists of the features of construction and combination hereinafter described and claimed.

In the accompanying drawings, forming part of this specification, Figure 1 is a view of my improved sling shown suspended by the spreader of a hoisting-machine. Fig. 2 is a side elevation of the clamp with the side plate removed and showing the ring of the cane-holding loop in section. Fig. 3 is a top view thereof. Fig. 4 is a side elevation, and Fig. 5 is a detail of a clip for securing the folded end of the rope upon itself.

In the drawings, A represents the rope or cable of the sling, formed at its ends with loops 2, the ends of the rope being folded and secured by clips 3, forming eyes 4, in each of which is secured a ring 5.

B represents a clamp slidable upon the rope A by means of the pulley 6. The clamp is held in set position upon the rope by means of the cam-shaped dog 7, having fulcrum-support 8 in the casing of the clamp and provided with a spring 9, arranged between said dog and the side wall of the clamp and normally holding said dog in contact with the rope. As will be evident by reference to Fig. 2, an upward pull upon the rope 2 will turn the dog outward, allowing the rope to pass freely between the dog and pulley, while a pull upon the rope in the opposite direction will turn the dog inward, as shown in Fig. 4, causing it to tightly clamp the rope. Enlargement of the loops 2 by means of the outward pressure of the contained cane is thereby prevented. Having fulcrum-support 10 upon the opposite end of the clamp is a jaw 11, which works in connection with the fixed jaw 12 of the clamp to form an opening 13 to receive the ring 5. The jaw 11 is adapted to be held in closed position by means of the dog 14, having pivotal support 15 in the casing of the clamp and being formed in its lower end with a notch 16, adapted to receive the spur 17 upon the rear end of the jaw 11. A coil-spring 18 is arranged between the locking-dog 14 and the side wall of the clamp and normally holds the dog in locking engagement with the jaw 11, as shown in Fig. 4. The locking-dog is formed in its upper end with an opening 19, through which may be passed a cord 20, by which the dog may be turned into unlocked position. The walls of the clamp are formed with upwardly-extending ears 24 to protect the locking-dogs 14 and prevent them being accidentally released.

In use the ends of the rope, which constitute the loops 2, are laid across the wagon which is used for the transporting of the cane, the clamps B being upon one side of the wagon and the released rings 5 upon the other. The desired quantity of cane having been placed in the wagon upon the rope, the rings 5 are placed in the openings 13 and the upper jaws 11 turned into locking position, as shown in Fig. 4. When it is desired to unload the cane, the rope A intermediate of the loops may be engaged by the hooks 20 of the spreader 22, hung from a hoisting-machine by chains 23, as shown in Fig. 1, and as the sling is lifted the rope A will be pulled through the clamps, constricting the size of the loops to firmly grip the bundle of cane, the clamping-dogs 7 preventing the loops from being enlarged by the pressure of the cane. When it is desired to release the sling from the cane, the dogs 14 may be turned out of locking engagement with the jaws 11 by means of the cords 20, as shown in Fig. 2, when the pressure of the rings 5 will force the jaws 11 into open position and release the cane. While the invention is particularly designed for holding sugar-cane, it may be desired to use it for other purposes.

I claim—

1. In a device of the class described, combination with a rope, a clamp slidable thereon, a dog carried by said clamp and adapted to engage said rope to prevent its being drawn in one direction, but allowing it to be drawn therethrough in the opposite direction, means carried by said clamp for holding the end of the rope to form a loop, and a dog for securing said means in position holding the rope.

2. In a device of the class described, the combination with the rope, of a clamp slidable thereon, a dog holding said clamp in set position, jaws for receiving and holding the end of the rope, and a spring-controlled dog normally holding said jaws in locked position.

3. In a device of the class described, the combination with the rope, of a clamp slidable thereon, a dog engaging said rope and normally preventing it being drawn through the clamp in one direction, while allowing it to be drawn therethrough in the opposite direction, jaws adapted to receive a ring carried by the end of the rope, and a dog normally holding said jaws in locked position.

4. A device of the class described, provided with a pulley to receive the rope, an adjacent clamping-dog adapted to engage with said rope to prevent its being drawn through the clamp in one direction but allowing it to be drawn therethrough in the opposite direction, jaw members, one of said members having pivotal support, and a dog having interlocking connection with said pivoted jaw member.

5. A clamping device of the class described, provided with a pulley to receive the rope, an adjacent dog, and a spring normally holding said dog in engagement with said rope, jaw members carried by the opposite end of said clamp, one of said members having pivotal support, a dog adapted to hold said pivoted jaw member closed, and a spring normally holding said dog in locking position.

6. A clamping device of the class described, adapted to receive a rope, a cam-shaped dog normally engaging with said rope to prevent its being drawn through the clamp in one direction while allowing it to be freely drawn in the opposite direction, jaw members carried by said clamp and adapted to receive the end of said rope, one of said members having pivotal support, a spring-controlled dog normally interlocking with said pivoted member to hold it closed, but adapted to be released to allow said member to be automatically opened by the pressure upon the rope.

In testimony whereof I affix my signature in the presence of two witnesses.

OLIVER CROSBY.

Witnesses:
P. J. G. D'ALBANI,
J. A. COFFEY.